United States Patent

Rogers

[15] 3,699,475

[45] Oct. 17, 1972

[54] DOUBLE-MODE TUNED MICROWAVE OSCILLATOR

[72] Inventor: Robert G. Rogers, Los Altos, Calif.

[73] Assignee: GTE Automatic Electric Laboratories Incorporated, Northlake, Ill.

[22] Filed: Feb. 16, 1971

[21] Appl. No.: 115,449

[52] U.S. Cl. .............331/101, 331/117 D, 333/82 B, 333/84 M

[51] Int. Cl. .............H03b 5/18

[58] Field of Search.............331/96–99, 101, 331/117 D; 333/82 B, 84 M

[56] References Cited

UNITED STATES PATENTS

| | | | |
|---|---|---|---|
| 2,405,229 | 8/1946 | Mueller et al. | 331/99 |
| 2,735,941 | 2/1956 | Peck | 331/101 X |
| 2,483,189 | 9/1949 | Eaglesfield | 331/101 |
| 3,290,614 | 12/1966 | Racy | 331/101 X |

*Primary Examiner*—Roy Lake
*Assistant Examiner*—Siegfried H. Grimm
*Attorney*—K. Mullerheim, Leonard R. Cool, Russell A. Cannon and Theodore C. Jay, Jr.

[57] ABSTRACT

Two lengths of short circuited transmission lines that are defined by their odd and even-mode characteristics are connected to a microwave transistor to provide the external feedback network of a microwave oscillator. The feedback network may be obtained by using separate odd and even-mode transmission lines or, alternatively, the odd and even-mode transmission lines may be combined to form an extremely compact oscillator. Even when so combined, the positions of short circuits on the transmission line may be adjusted to permit frequency tuning and power peaking of the oscillator.

15 Claims, 9 Drawing Figures

"PRIOR ART"

"PRIOR ART"

INVENTOR
ROBERT G. ROGERS
BY Leonard R. Cool
AGENT

DOUBLE-MODE TUNED MICROWAVE OSCILLATOR

BACKGROUND OF THE INVENTION

1. Field of the Invention

This invention relates to oscillators for generating electrical oscillations and more particularly to microwave oscillators in which the frequency and amplitude stability are controlled by double-mode tuning.

2. Description of the Prior Art

In the past, microwave oscillators have been constructed using a wide variety of active oscillating elements. For example, negative resistance devices such as the GUNN device, avalanche diodes, tunnel diodes, and the like have been used, since they may be made to oscillate simply by shunting them with tuned circuits. However, since such devices are essentially single-port devices, they do not allow separation of the load and oscillating frequency determining characteristics of the circuits of which they are a part. Consequently, microwave oscillator circuits using such devices tend to be somewhat inefficient, unstable, and rather difficult to tune.

But with two-port devices, such as the microwave transistor, oscillators may be designed in which the load and frequency determining elements could be separated, thus improving performance appreciably. One such oscillator is described in an article entitled, "-Microwave Varactor-Tuned Transistor Oscillator Design" by K. M. Johnson, published in the IEEE Transactions on Microwave Theory and Techniques, Vol. MTT-14, No. 11, Nov. 1966, pp. 564–572. Disadvantages of this oscillator include its nonlinear tuning characteristics and its frequency shift with temperature changes.

With devices such as the microwave transistor, due to its high internal feedback and phase shift at microwave frequencies, grounding the base and supplying a tuned circuit and load to the collector will yield oscillations, regardless of the disposition of the emitter element. This is also basically a negative-resistance oscillator. Alternatively, the collector may be grounded with a tuned circuit connected to the base. Again the emitter may be placed at ac ground or open-circuited. The useful load may be connected between the tuned circuit and ground or between the (ungrounded) emitter and ground. More conventionally, the base or emitter may be grounded, a tuned circuit connected between emitter or base and ground and an output circuit connected to the collector. This more conventional approach gives better performance. Optimum load and tuning conditions may be obtained, since the two functions are separated. Thus FM noise is reduced and the stability is improved.

But with microwave transistors, particularly those operated close to their upper frequency-limits, an external feedback circuit is needed to assure oscillations. This feedback may be quite simple or it may be relatively complex. An example of the latter is described in U.S. Pat. No. 3,393,378 entitled, "High-Frequency Oscillator," in which I was a co-inventor. The oscillator may be made as two separate elements, an amplifier and a feed-back circuit. Such an oscillator is described in an article entitled, "A Low-Noise Class-C Oscillator Using a Directional Coupler," by H. J. Peppiatt, J. A. Hall and A. V. McDaniel, Jr., published in the IEEE Transactions on Microwave Theory and Techniques, Vol. MTT-16, No. 9, Sept. 1968, pp. 748–752. A block diagram of such an amplifier and feedback circuit is given in FIG. 1. This form of oscillator has quite low FM noise, but due to the electrically long feedback path required at microwave frequencies, it is difficult to insert a tuning cavity to give reasonable operation in communications applications, where frequency modulation is required. Further, it is not compact and simple to manufacture. In addition, frequency drift with temperature is high because of the transistor, since its characteristics change appreciably with temperature.

SUMMARY OF THE INVENTION

A novel oscillator circuit was developed in which odd and even TEM modes are induced in the tuning circuit of an active two-port device. A microwave transistor may be used as the active two-port device and, when used, the voltages between base, collector, and ground are a combination of both even and odd modes. Separate odd and even mode transmission lines may be connected to the ports of the device and its output frequency and power adjusted by tuning of the odd and even-mode transmission lines. Because of their approximate mode orthogonality, the two modes may coexist on a single transmission line and the tuning of one mode is essentially independent from that of the other mode.

In one embodiment of the invention a transistor is arranged in a common emitter configuration because it is the most stable and it minimizes parasitic oscillations at lower frequencies (tens of megacycles) where transistor current gain is very high. A two-conductor transmission line connected between the collector and base of the transistor has both conductors and the ground plane shorted together at the end opposite the transistor. This line acts as an even-mode transmission line since the currents at adjacent points on the two conductors are in phase.

Shunted across the even-mode circuit, at the transistor, is another double-conductor transmission line. These conductors are shorted together at the far end, i.e. the end away from the transistor, but they are not shorted to the ground plane. This line acts as an odd-mode transmission line since the currents at adjacent points on the two conductors are out of phase.

Techniques for determining network equivalents for coupled transmission lines are described in an article entitled, "Simplified Analysis of Coupled Transmission Line Networks," by R. Sato and E. G. Cristal, published in the IEEE Transactions on Microwave Theory and Techniques, Vol. MTT-18, No. 3, Mar. 1970, pp. 122–131. Other pertinent references include: E. Jones and J. Bolljahn, "Coupled-Strip Transmission-Line Filters and Dielectrical Couplers," IEE Transactions on Microwave Theory and Techniques, Vol. MTT-4, pp. 75–81, Apr. 1956; and the book, G. Matthaei, L. Young, E. Jones, "Microwave Filters, Impedance-Matching Networks, and Coupling Structures," McGraw Hill, New York, 1964, pp. 219 through 228. By the use of similar techniques the network equivalent of the combination of the two coupled transmission lines is in the form of a $\pi$-section. Because of the connection of the coupled transmission lines with the transistor, a $\pi$-section feedback circuit is obtained. Thus a microwave oscillator is derived which is essentially identical to the Gouriet-Clapp oscillator, described in an article entitled, "Frequency Stable LC Oscillators" by J. K. Clapp, published in the Proceeding of the IRE, Vol. 42, No. 8, Aug. 1954, pp. 1295–1300. The oscillator configuration is shown in simplified schematic form, less output circuit, in FIG. 2. The series-resonant circuit comprising capacitor 24 and inductor 26 determines the frequency of oscillation almost entirely. The two capacitors 20 and 22 are quite large, being limited only by the available transistor gain. In fact, the $\pi$-section consisting of capacitor 22 at the input, capacitor 20 at the output, and the series-resonant circuit capacitor 24 and inductor 26 as the series element is chosen, together with the transistor characteristics, so as to satisfy the following equation:

$$AB = 1 \qquad 1.$$

where:

A designates the amplification factor of the amplifier, and

B designates the transfer function of the feedback network.

In a low frequency circuit where the transistor appears as a unilateral device with 180° phase shift between input and output, the $\pi$-section would require 180° phase shift and transmission magnitude so that the following equation is satisfied:

$$AB = 1 \qquad 2.$$

The oscillator of FIG. 2 with a quartz crystal in place of the series-resonant circuit represented by capacitor 24 and inductor 26 is universally used in the ultimate of quartz frequency standards.

This invention makes use of the Gouriet-Clapp type circuit, but since at the frequency of operation the transistor has other then its low-frequency phase shift, the series element equivalent to the series capacitor resonant circuit will not be a series-resonant circuit at the operating frequency.

Accordingly, one object of this invention is to provide a novel microwave oscillator circuit that is both compact and easily tunable.

Another object of this invention is to provide a novel transistor oscillator that is highly stable and efficient. Yet another object of the instant invention is to provide an improved transistor microwave oscillator that has singularly low FM noise.

BRIEF DESCRIPTION OF THE DRAWINGS

A more complete appreciation of the objects of the invention and the many attendant advantages thereof will be readily appreciated by reference to the following detailed description when considered in connection with the accompanying drawings, wherein.

DETAILED DESCRIPTION OF THE INVENTION

Figure 1:
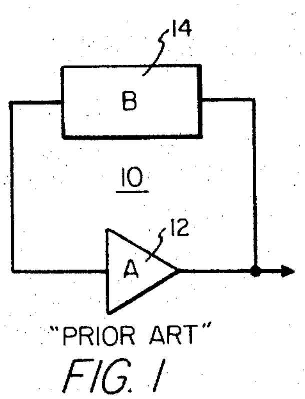
FIG. 1 is a block diagram of a feedback amplifier as an oscillator.
Figure 2:
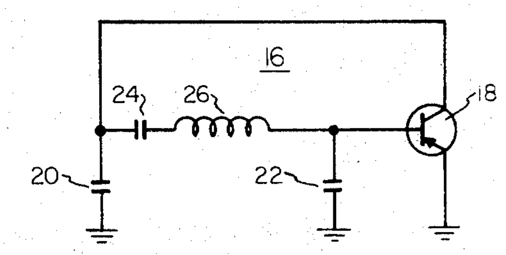
FIG. 2 is a schematic diagram of a Gouriet-Clapp oscillator circuit.
Figure 3:
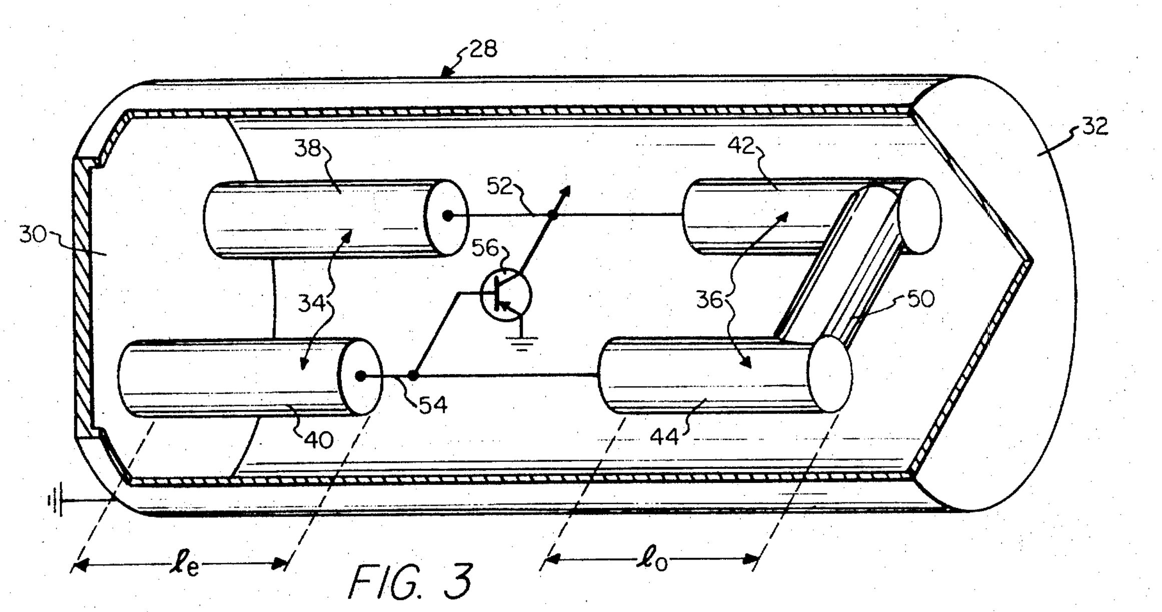
FIG. 3 is a perspective illustration, partly broken away, of a double-mode oscillator, having separate even and odd-mode transmission lines.

Referring now to the drawings, wherein like reference numerals designate identical or corresponding parts throughout the several views and more particularly to FIG. 3 thereof, an oscillator, following the teachings of the instant invention, is enclosed within a cylindrical housing or cavity 28, having end walls 30 and 32. Housing or cavity 28 is constructed of an electrically conductive material, such as copper, and is electrically grounded. The structure within housing 28 consists essentially of an even-mode transmission line 34 and an odd-mode transmission line 36. Even-mode transmission line 34 consists of a pair of conductive elements 38 and 40 connected to end wall 30 of housing 28. Since end wall 30 is of conductive material, the ends of elements 38 and 40 are short-circuited together and to the cavity 28, which is the principal structural characteristic of even-mode short circuited transmission line 34. As is known by those skilled in the art, the currents on the conductive elements 38 and 40 forming the even-mode transmission line are in phase at adjacent points on these elements.

Similarly, odd-mode transmission line 36 is formed of two conductive elements 42 and 44. These two conductive elements are shown as a separate transmission line in order to emphasize the odd and even-mode characteristics that may be obtained from the separate transmission lines. In practice, it would be more practical to simply extend conductive elements 38 and 40 to the appropriate length beyond the connection point for transistor 56. This simplifies the construction and will eliminate the need for interconnecting conductive elements shown as 52 and 54.

Transmission line 36 is short-circuited by conductor 50, which is connected to conductive elements 42 and 44 at the ends of the elements. While it would be possible to have shorting conductor 50 slidably connected between elements 42 and 44, the presence of a transmission line extending beyond the short would be a detriment rather than an improvement in performance. One way to avoid this problem is to use hollow conductors for the transmission line elements 42 and 44 and to use a trombone slide arrangement to provide a short at the end of the transmission line. Conductor 50 will then be essentially "U" shaped and will slidably engage the conducting elements 42 and 44. Conducting elements 42 and 44 would form a portion of the transmission line, the sides of the "U" shaped conductor 50 would form the remainder of the line, and the bottom of the "U" would provide the short at the end of the transmission line. For simplicity of discussion, the conductive elements 42 and 44 will include the sides of the "U", and the conductor 50 will designate the short at the end of the transmission line. The conductive elements 42 and 44 are suspended from the housing by non-conducting supporting material not shown which leaves the transmission line 36 suspended from the housing. Thus conductive elements 42, 44, and 50 form an odd-mode transmission line on which the currents at adjacent points on elements 42 and 44 are out-of-phase.

As hereinabove noted, the two transmission lines shown in FIG. 3 are interconnected. More particularly, element 38 is connected to element 42 by conductive element 52, while element 40 is similarly connected to element 44 by conductive element 54. The links of these interconnecting elements, if used, should be minimal and, as hereinabove noted, the use of continuous conductive elements is preferred. It will be observed that the length of the even-mode transmission line 34 is designated $l_e$, while the length of the odd-mode transmission line 36 is designated $l_0$.

A transistor 56 is coupled to the interconnected transmission lines with its collector connected to conductor 52 and its base connected to conductor 54. The emitter of the transistor 56 may be grounded, as by connecting it to housing 28. The output of the oscillator circuit may be taken from the collector circuit of transistor 56, or from any other appropriate portion of the circuit. To simplify the diagrams, no biasing circuitry has been illustrated. Of course, it will be at once apparent to those skilled in the art that such circuitry is necessary, and that conventional bias circuitry may easily be added to the circuit shown. The same is true of all circuits described herein.

Figure 4:
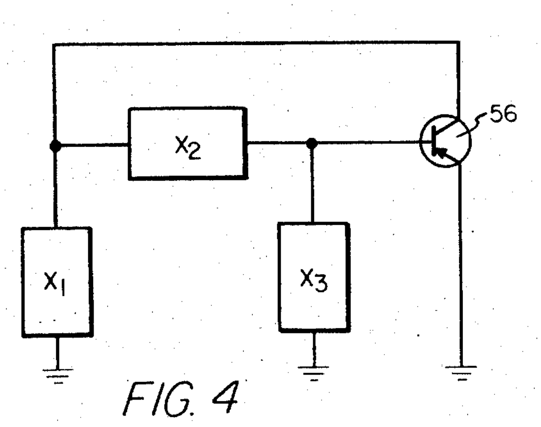
FIG. 4 is a schematic diagram of the impedance configuration of the oscillator illustrated in FIG. 3.

The combined even and odd-mode voltages existing on conductors 52 and 54 are applied to transistor 56. These combined modes have the same effect on transistor 56 as a hypothetical $\pi$-section feedback network. If there were no losses in the transmission lines of the oscillator of FIG. 3, the equivalent hypothetical $\pi$-section feedback network would be purely reactive and would appear as shown in FIG. 4. The equivalent circuit includes three interconnected reactances, $X_1$, $X_2$, and $X_3$. Of Of these, $X_1$ is grounded and connected to one side of $X_2$ while $X_3$ is connected to the other side of $X_2$, and is also grounded. The collector of transistor 56 is connected to the juncture of $X_1$ and $X_2$ while the base of the transistor is connected to the juncture of $X_2$ and $X_3$. It is only when the oscillator circuit of the instant invention is displayed in this hypothetical form that its similarity to the Gouriet-Clapp circuit, described hereinabove, is evident. It will be observed that the hypothetical circuit of FIG. 4 also explains the operation of the oscillator embodiment of FIGS. 5 and 6, which will be described in detail hereinafter.

The oscillator shown in the FIG. 3 embodiment possesses the advantages of two-port circuits, described hereinabove, and it includes two separate tunable components (the even and odd-mode transmission lines) which allow separation of the load and frequency determining parameters of the circuit.

The combined transmission line 58 includes two conductive elements 60 and 62 directly connected to end wall 30 of housing 28. The elements are short circuited together and to the end wall 30, forming the same type of even-mode short circuit described with respect to even-mode transmission line 34 of FIG. 3. As far as the even mode is concerned, conductors 60 and 62 are everywhere at the same potential. So conductor 64 can be and is connected between elements 60 and 62 at a suitable point, forming an odd-mode circuit as described with respect to odd-mode transmission line 36 of FIG. 3. The combination of both short circuit configurations results in the combined even and odd-mode transmission line 58. These can co-exist because of the fact that the fields for the two different modes are substantially orthogonal as far as their short circuits are concerned. The odd-mode short can be tuned by moving conductive element 64 along the transmission elements. It is important to note that where the electrical length between odd-mode short 64 and even-mode short 30 approaches a half wavelength at the operating frequency of the oscillator, an odd-mode resonance occurs on this length of conductors 60 and 62 which couples energy from the circuit, resulting in a deterioration in performance. To avoid this problem, an additional short 65 is introduced that is intermediate between the odd and even-mode shorting elements. This insures that an uninterrupted length of conductors 60 and 62 that is electrically a $\lambda/2$ long at the oscillator operating frequency cannot exist between the odd-mode short 64 and even-mode short 30.

Transistor 56 is connected directly to transmission line 58 through its collector to conductive element 60 and through its base to conductive element 62. Again, the emitter is connected to ground; however, other transistor configurations may also be used. The combined even and odd-mode voltages applied to transistor 56 in the FIG. 5 embodiment are the same as those applied in the FIG. 3 embodiment. As in the FIG. 3 embodiment, the oscillator output may be taken from the collector lead of transistor 56.

With regard to the transmission line lengths, $l_e$ and $l_o$ may be of about the same length for oscillation, with $l_e$ being the shorter of the two. Thus, in general, $l_o$ may be slightly longer than $l_e$. This limitation creates no problem in the FIG. 3 embodiment when the two lines are separate. This means that electrically the even-mode circuit in FIG. 5, however, should be between conductor 64 and the transistor. In the FIG. 5 embodiment, however; $l_o$ cannot be physically longer than $l_3$, since $l_e$ extends to the end wall 30 of housing 28. As a solution to this problem, the even-mode short circuit 30 is moved a half wavelength measured at the oscillator operating frequency down the line 58 from its desired position and in the direction away from the transistor. An even-mode short circuit is then reflected between conductor 64 and the transistor. The resulting length $l_e$ is then electrically shorter, although physically longer, than $l_o$.

It was found that the length of the odd-mode transmission line, $l_o$, determined the frequency of the oscillator with great accuracy. In practice, its tuning rate is about 600 MHz per inch. The length of the even-mode transmission line, $l_e$, on the other hand was found to tune the power output at a rate of only about 60 MHz per inch. Thus, the even and odd-mode lines can be separately tuned to independently set the frequency and peak output power of the oscillator. It will be noted that $l_e$ and $l_o$ are separately adjustable in the FIG. 5 embodiment, even though only one pair of elements 60 and 62 is used, since the length $l_o$ can be adjusted by sliding 64 along 60 and 62, while the length $l_e$ can be adjusted by moving the position of 30.

Figure 5:
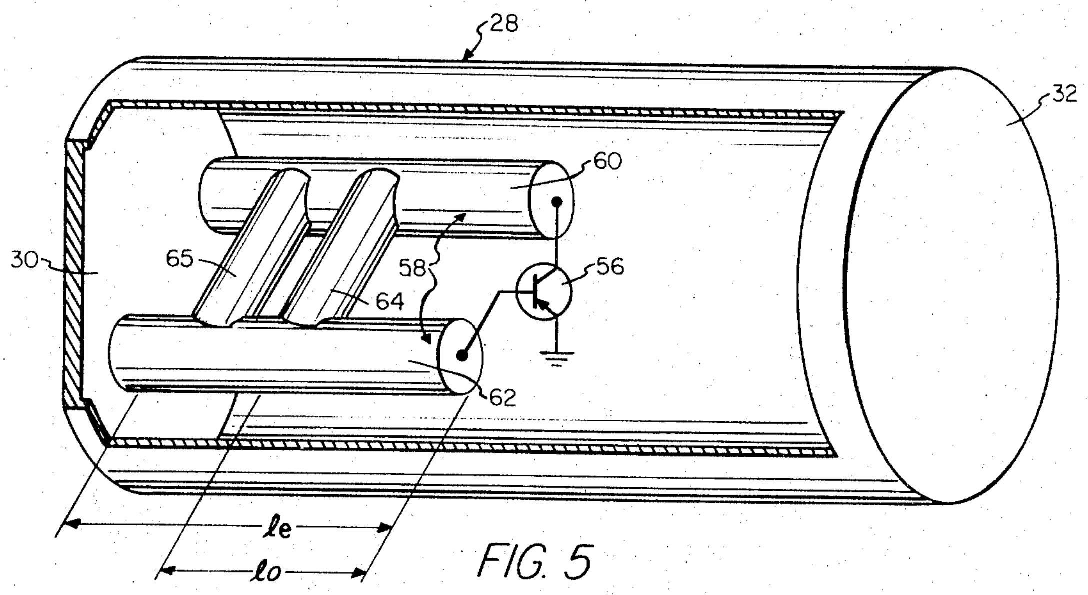
FIG. 5 is a perspective illustration, partly broken away, of a double-mode oscillator, having combined even and odd-mode transmission lines.

The FIG. 5 oscillator was found to be highly efficient with frequency, relatively independent of transistor characteristics and low in FM noise. The efficiency of the oscillator was found to be approximately 30 percent at 2 GHz, even considering various biasing power losses. The oscillator was found to provide a very stable and consistent output that was largely independent of the type of transistor used. Examples of some transistors used are the following: United Aircraft S2002, TRW 2N5482 and 2N5483, and MSC 2003. In addition, the FM noise level of the oscillator was found to be at least 90 dB below 200 kHz rms deviation in a 2-kHz band from 70 kHz off the carrier out to several megahertz.

Figure 6:
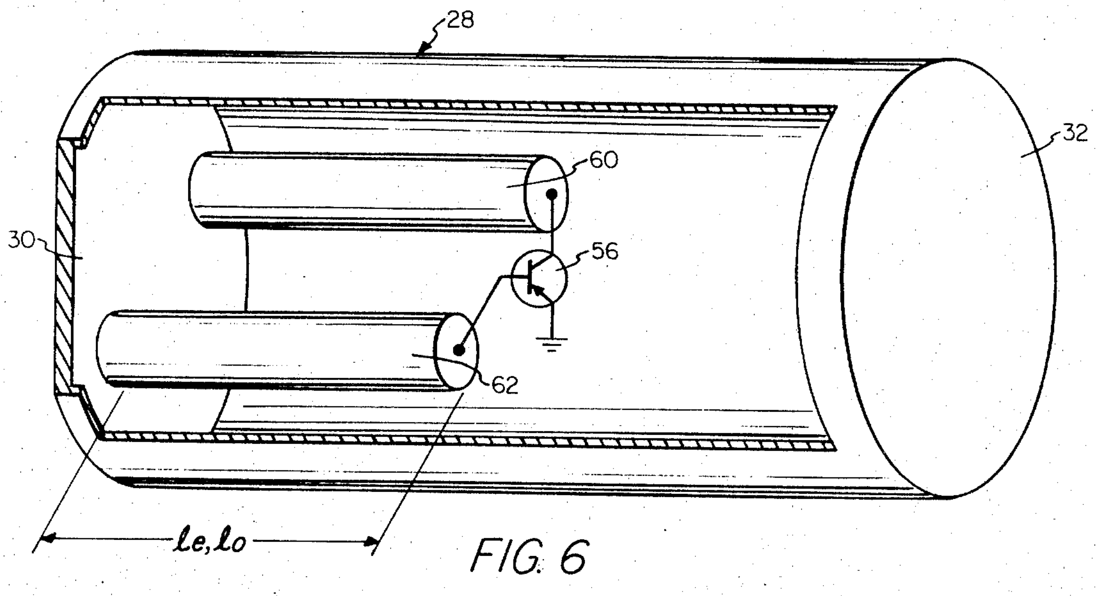
FIG. 6 is a perspective illustration, partly broken away, of a compact double-mode oscillator, also having combined even and odd-mode transmission lines.

An oscillator of even simpler geometric configuration is illustrated in FIG. 6. This oscillator is identical to the FIG. 5 embodiment, except that the odd-mode short circuit 64 has been eliminated. This oscillator configuration effectively combines the even and odd-mode transmission lines into one. The combination is possible since both even and odd-mode short circuits may in some oscillator designs lie in approximately the same plane, and the end wall 30 is now in reality both an even and odd-mode short.

This oscillator is, of course, more compact, easier to manufacture, and simpler to tune than that of FIG. 5 since one control has effectively been eliminated by the combination of even and odd transmission lines into one. However, the lack of two separate controls does not permit the separate tuning obtainable in the embodiment of FIG. 5. The oscillator of FIG. 6 is not quite as stable or as resistant to FM noise or as independent of the type of transistor used with it as that of FIG. 5. However, it is still quite a good oscillator and is very economical to manufacture and easy to install due to its compact structure.

In building oscillators as described hereinabove for a frequency of about 2 GHz, it was found that very good performance could be obtained if the conductive elements (38 40, 42, 44, 60, and 62) were made with diameters of 0.125 inch. (The conductors 38, 40, 42, and 44 need not be of the same diameter). An optimum spacing between the conductive elements was found to be 0.208 inch. A convenient diameter for cylindrical housing 28 was found to be 0.650 inch. Clearly, these dimensions are merely intended to be illustrative, and the practice of the invention is in no way confined to them.

Figure 7A:
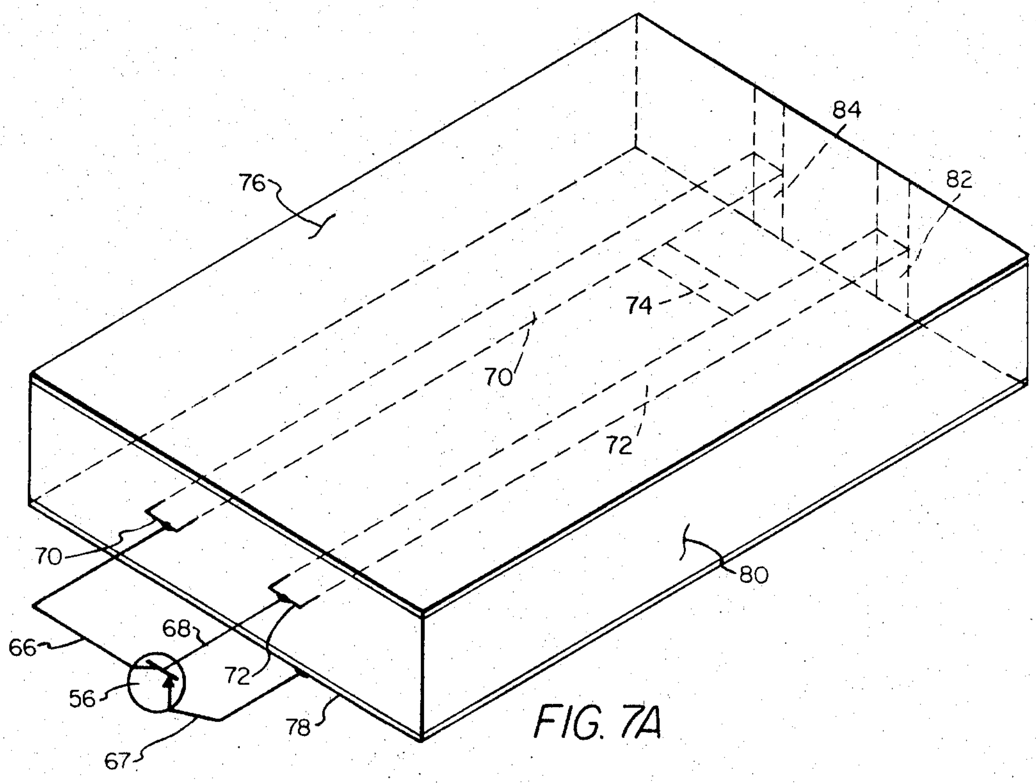
FIG. 7A is a perspective illustration of a double-mode tuned microwave oscillator, utilizing stripline techniques.
Figure 7B:
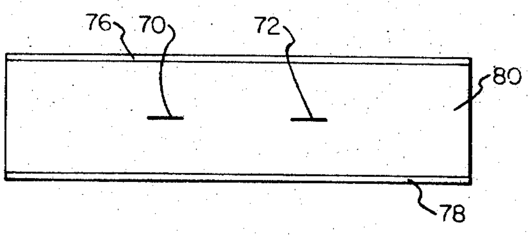
FIG. 7B is a left side view of the oscillator in FIG. 7A with transistor removed, showing the relationship of the strip transmission line, ground planes, and dielectric.
Figure 7C:
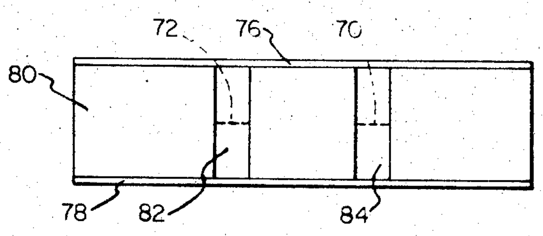
FIG. 7C is a right side view of the oscillator in FIG. 7A showing an even-mode shorting arrangement.

Alternative oscillator geometries using the basic tuning configurations of the various embodiments of the invention illustrated in FIGS. 3, 5, and 6 could be constructed using stripline or micro-strip elements in place of the generally coaxial transmission line configuration illustrated herein. An example of a stripline configuration of one embodiment is shown in the three views of FIG. 7A, FIG. 7B, and FIG. 7C. The conductive elements 70 and 72 are suspended in dielectric 80 between ground planes 76 and 78. Transistor 56 is connected as before in a common emitter configuration and only the technique whereby the odd and even modes coexist on one pair of transmission lines is illustrated. The odd-mode short 74 is connected between conductive elements 70 and 72. The even-mode short connects the ends of conductive elements 70 and 72, that are opposite the transistor end, to the ground planes 76 and 78 by means of conductive elements 82 and 84. While this grounding of the ends of the conductive elements is illustrated using two separate conductive elements, it is most usual to ground the end by means of a single conductive element.

While the transistor has been shown only in a common emitter configuration, it is apparent that other configurations may also be used and the illustration of only one configuration was illustrated in the interest of clarity, and was not meant to be restrictive. In addition, other active two-port devices, such as vacuum tubes, could be used in place of the transistor shown in the embodiments of the instant invention. Also, FIG. 7 shows a configuration equivalent to the coaxial configuration illustrated in FIG. 5. To anyone versed in the art, a stripline circuit may also be realized that is the equivalent of either FIG. 3 or FIG. 6.

Obviously, numerous modifications and variations of the present invention are possible in light of the above teachings. It is therefore to be understood that within the scope of the appended claims, the invention may be practiced otherwise than as specifically described herein.

What is claimed is:

1. A solid-state microwave oscillator comprising:
transmission line means geometrically configured to support both even and odd-mode electromagnetic waves, said transmission line means comprising;
two parallel conductors; and
first and second short-circuiting means interconnecting said parallel conductors; and
amplifying means coupled to the transmission line means, said transmission line means forming an external feedback path around the amplifying means causing said amplifying means to oscillate.

2. A solid-state microwave oscillator comprising:
transmission line means geometrically configured to support both even and odd-mode electromagnetic waves, said transmission line means comprising;
an electrically conductive cylindrical cavity having an end wall; and
two parallel conductors mounted within said cavity and short-circuited together by the end wall of said cavity; and
amplifying means coupled to the transmission line means, said transmission line means forming an external feedback path around the amplifying means causing said amplifying means to oscillate.

3. A solid-state microwave oscillator comprising:
transmission line means geometrically configured to support both even and odd-mode electromagnetic waves, said transmission line means comprising;
an electrically conductive rectangular cavity having an end wall; and
two parallel conductors mounted within said rectangular cavity and short-circuited together by the end wall of said cavity; and
amplifying means coupled to the transmission line means, said transmission line means forming an external feedback path around the amplifying means causing said amplifying means to oscillate.

4. A solid-state microwave oscillator comprising:
transmission line means geometrically configured to support both even and odd-mode electromagnetic waves, said transmission line means comprising;
ground reference surface means;
two parallel conductors located with respect to said ground reference means for supporting both odd and even modes of propagation;
first short-circuit means electrically connecting said two parallel conductors together; and
second short-circuit means electrically connecting said two parallel conductors together and to said ground reference means; and
amplifying means coupled to the transmission line means, said transmission line means forming an external feedback path around the amplifying means causing said amplifying means to oscillate.

5. A microwave oscillator as in claim 4, wherein said amplifying means is connected to said parallel conductors at points between the positions of said first and second short circuit means on said conductors.

6. A microwave oscillator as in claim 5, said first and second short circuit means being movable for changing the positions thereof on said parallel conductors for tuning the oscillator.

7. A microwave oscillator as in claim 6 wherein said first short circuit means comprises a trombone sliding structure cooperating with said parallel conductors for electrically maintaining the position of the first short circuit proximate associated ends of said parallel conductors.

8. A microwave oscillator as in claim 4, wherein said amplifying means is connected to adjacent ends of said parallel conductors that are closest to said first short-circuiting means.

9. A microwave oscillator as in claim 8, wherein:
said transmission line means is a stripline circuit.

10. A microwave oscillator as in claim 8, wherein at least said first short circuit means is movable for changing the position thereof on said parallel conductors for tuning the oscillator.

11. A microwave oscillator as in claim 8, wherein said ground reference surface means comprising an electrically conductive cavity in which said parallel conductors are located.

12. A microwave oscillator as in claim 11, wherein said first and second short circuit means comprise the same movable end wall of said cavity.

13. A microwave oscillator as in claim 11, wherein said second short circuit means comprises a movable end wall of said cavity.

14. A microwave oscillator as in claim 13, wherein said first short circuit means is physically located on said parallel conductors between said adjacent ends of the latter and said wall, said wall being electrically spaced greater than a half wavelength from said adjacent ends of said conductors for electrically positioning the second short circuit between said first short circuit means and said adjacent ends of said conductors.

15. A solid-state microwave oscillator comprising:
transmission line means geometrically configured to support both even and odd-mode electromagnetic waves, said transmission line means comprising;
ground reference surface means;
two parallel conductors;
first short-circuit means electrically connecting said two parallel conductors together;
second short-circuit means electrically connecting said two parallel conductors together and to said ground reference surface means; and
third short-circuit means connected across said two parallel conductors between the positions of said first and second short-circuit means on said conductors; and
amplifying means coupled to adjacent ends of said parallel conductors, said transmission line means forming an external feedback path around the amplifying means causing said amplifying means to oscillate.

* * * * *

UNITED STATES PATENT OFFICE
CERTIFICATE OF CORRECTION

Patent No. 3,699,475 Dated October 17, 1972

Inventor(s) Robert G. Rogers, Los Altos, Calif.

It is certified that error appears in the above-identified patent and that said Letters Patent are hereby corrected as shown below:

Column 2, line by no. 57, change "IEE" to -- IEEE --; column 3, line 31, change "AB = 1" to -- |AB| = 1 --; column 5, between lines 62 and 63 (actual line count) which is adjacent the line no. 65, insert the paragraph -- It was found that these advantages can be retained in an even more compact oscillator configuration, illustrated in FIG. 5. Referring now to a preferred embodiment of this invention in FIG. 5, a combined even and odd-mode transmission line 58 comprising conductors 60 and 62 is shown connected to end wall 30 of cylindrical housing 28. This combination of the two transmission lines 34 and 36 is made possible by the fact that the conductors 38 and 40 of the even-mode line 34 in FIG. 3 are at the same potential whereas the conductors 42 and 44 of the odd-mode line 36 are at opposite potentials (i.e., the potentials at adjacent points on conductors 42 and 44 are the same magnitude but of opposite polarity), and by the fact that combined even and odd modes can exist simultaneously on the same transmission line. Thus, a conductor 64 electrically connected to conductors 60 and 62 between the connection thereof to transistor 56 and wall 30 has no effect on even modes on conductors 60 and 62 but is a short circuit to odd modes on these conductors. The total length $\ell_e$ of conductors 60 and 62 is therefore an even-mode line whereas only the length $\ell_o$ of these conductors comprises the odd-mode line. --;
and column 6, line by no. 49, "$\ell_3$" should be -- $\ell_e$ --.

Signed and sealed this 22nd day of May 1973.

(SEAL)
Attest:

EDWARD M.FLETCHER,JR.
Attesting Officer

ROBERT GOTTSCHALK
Commissioner of Patents